United States Patent [19]
Schaefer et al.

[11] 4,167,950
[45] Sep. 18, 1979

[54] CONTAINER WASHING APPARATUS

[75] Inventors: Frederick W. Schaefer, Denver; Ronald W. Stierle, Arvada, both of Colo.

[73] Assignee: Wash Wagon Corporation, Lakewood, Colo.

[21] Appl. No.: 895,255

[22] Filed: Apr. 10, 1978

[51] Int. Cl.² ............................ B08B 3/02; B60S 3/04; B08B 9/08
[52] U.S. Cl. ................................. 134/52; 134/168 R
[58] Field of Search ............... 134/45, 52, 56 R, 57 R, 134/58 R, 95, 123, 167 R, 168 R

[56] References Cited
U.S. PATENT DOCUMENTS

| | | | |
|---|---|---|---|
| 3,534,746 | 10/1970 | Posner | 134/52 X |
| 3,830,430 | 8/1974 | Hartunian | 134/45 X |
| 3,897,263 | 7/1975 | Davis et al. | 134/45 |
| 3,961,983 | 6/1976 | Crandall et al. | 134/45 X |
| 3,973,988 | 8/1976 | McMahan | 134/52 X |
| 4,106,516 | 8/1978 | Wiegand | 134/45 |

Primary Examiner—Robert L. Bleutge

[57] ABSTRACT

A trailer or container washing system includes a wheeled-cart adapted for being driven into and out of a container, such as a meat-hauling trailer. Water is supplied to rotating nozzles and a spray bar mounted to the cart. A valve system, including a a unique valve control, is provided to supply different volumes of water to the nozzles and spray bar during a cleaning process which includes pre-wash, floor cleaning, wash and rinse cycles. The cart is preferably mounted on a moveable or stationary dock for being located at the opening to the trailer or container and novel dock configurations are disclosed herein. One such dock includes an adjustable tip-pan for receiving water and debris draining from the container. Other features of the present invention include a novel hose reel, a specially designed system for controlling the winding and unwinding of the water supply hose as the cart moves into and out of the container, and a valve for diverting water from the nozzles to the spray bar.

13 Claims, 10 Drawing Figures

CONTAINER WASHING APPARATUS

FIELD OF THE INVENTION

This invention relates generally to the art of cleaning devices, and more particularly to cart-mounted cleaners adapted to wash containers such as meat trailers, cargo containers, boxcars and the like.

BACKGROUND OF THE INVENTION

Many different types of machines are known to the art for cleaning containers such as trailers. The need for such machines is best illustrated by reference to trailers used for hauling meat. Such trailers generally become contaminated with pieces of meat, fat and blood during the hauling of the product. While it has long been the practice to clean such trailers, proposed governmental regulations will require more frequent cleaning. Furthermore, such regulations will require a very high cleaning efficiency, all of which dictates the need for improved cleaning processes and machinery.

Other types of containers also need to be cleaned regularly. Typical examples of such other containers include refrigerated trailers used for hauling produce or other food materials, cargo containers such as the type used on ships, railroad boxcars and the like. It is expected that mandatory cleaning regulations may be issued in the near future which will establish guidelines on the frequency and efficiency of the cleaning procedures used for these types of containers.

Until very recently, most cleaning of trailers and other similar types of containers was accomplished manually. A workman swept the trailer floor and cleaned the walls and ceilings using a high-pressure steam wand. This procedure is very time consuming and labor intensive and the effectiveness of the cleaning is totally dependent on the skill of the workman and the time devoted to each cleaning job. Moreover, this process is potentially dangerous since the workman or other people working in the vicinity could be injured by the high pressure and high temperature steam.

Two types of mechanical systems have recently been developed to make the cleaning of trailers faster, more economical and more efficient. A first type of automatic cleaner is the "boom" cleaner such as that described in the Crandall et al U.S. Pat. No. 3,961,983 issued June 8, 1976 for "Apparatus and Methods for Washing Interiors of Truck and Trailer Bodies." In this type of cleaner a washer head is mounted on the end of an elongate boom. The boom can either be stationary or movable along its axis. If the boom is stationary, a trailer is backed over the washing head, and water or a cleaning solution is sprayed from the nozzles as the head approaches the front end of the trailer. When the head reaches the front of the trailer, a rinse solution is sprayed from different nozzles and the trailer is driven slowly forward to finish the cleaning. Because the cleaning process in such systems requires both a driver for the truck and an operator for the cleaner, newer boom systems include an extendable boom. The trailer is parked, and the cleaning is accomplished by moving the boom back and forth into and out of the trailer. The water supply system for this type of cleaner typically includes separate nozzles for the wash and rinse solutions and separate supply hoses for the two fluids.

Several other patents can be mentioned to illustrate the other type of mechanical trailer washer. U.S. Pat. No. 3,534,746 was issued Oct. 20, 1970 to Posner for a "Portable Cleaner For Trailer Interiors." Posner's device includes a portable, self-propelled cleaner which comprises a rectangular frame and a plurality of nozzles disposed about the frame. The frame is mounted on a wheeled carriage which is powered by a motor for being driven into and out of the trailer body. A hose reel is mounted on the carriage for supplying steam or cleaning solution to the nozzles. Cleaning is accomplished by positioning the carriage at the rear of the trailer and driving the carriage into the trailer. Hose is unwound onto the floor of the trailer as the cleaning frame enters the body. The hose is rewound onto its reel by a system connected to the carriage drive motor. The Posner device does not include any type of system for varying the flow of liquid to the spray nozzles or for providing rinse and cleaning solutions to the same nozzles at different flow rates.

Another type of cart-mounted cleaner is described in Hartunian's U.S. Pat. No. 3,830,430 issued Aug. 20, 1974 for "Cleaning Vehicle." The spray mechanism of Hartunian is mounted to a power-driven frame and includes a plurality of nozzles adapted to be rotatively movable with respect to the base frame in at least two planes of motion. A tank of cleaning fluid and a high-pressure hose are mounted on the carriage. The hose and tank are interconnected to supply water to the nozzles. The patent does not include any mechanism for varying the water pressure or for alternately supplying wash and rinse solutions to the nozzles at different volume flow rates.

Yet another carriage-mounted cleaner is disclosed in McMahan's U.S. Pat. No. 3,973,988 issued Aug. 10, 1976 for "Trailer Washing Apparatus." This patent describes a different approach to trailer cleaning in that the power-driven carriage is movable into and out of the trailer while the hose reel, and wash and rinse tanks are located on a dock. The carriage includes rotating nozzles and valve means for selectively coupling the nozzles to either the wash or rinse tank depending on the operating cycle. The McMahan patent additionally provides for recirculation of liquids. For example, the wash and/or the rinse water may be recirculated to the wash tank. The rinse tank is refilled with clean water so that the final rinse cycle will always clean the trailer as thoroughly as possible. McMahan's patent also discloses various dock arrangements for providing the desired rearward slope for the trailer body and drain, filter and recirculation systems for carrying out the objects of that invention.

An improved carriage-mounted trailer washer is disclosed in co-pending, commonly assigned, patent application Ser. No. 785,196 filed on Apr. 6, 1977 by Richard McMahan for "Trailer Washing Apparatus." This application is a continuation of Ser. No. 696,647 filed June 16, 1976 and now abandoned. The McMahan application includes the recirculation, nozzle, hose and carriage systems of the earlier McMahan patent and additionally includes a time-delay and hose flushing system. The system stops the carriage when it reaches the front of the trailer body and starts the flow of clean water through the hose. Time-delay means delay the return trip of the carriage until the hose has been thoroughly flushed with the clean rinse water. In this manner the front of the trailer is rinsed with clean water.

Two other important features are also disclosed in the McMahan application. First, numerous dock arrangements are disclosed for permitting the carriage-mounted cleaner to be used in a variety of trailer cleaning environments. For example, various disclosed embodiments relate to cleaning alternate trailers backed up to a dock supporting the carriage, the carriage being pivotable about an angle of 180° to be located selectively at the rear of either trailer. Alternately, an arrangement is disclosed for permitting cleaning of trailers driven alongside of a dock. In this arrangement, the carriage is mounted on a 90° pivotable platform which is swung out and behind the parked trailer. The washer then enters the trailer for its cleaning cycles. A third embodiment permits the washer to clean a plurality of trailers backed up to the same side of a dock. The washer, in this embodiment, is mounted on a platform which is in turn mounted to a pair of rails and power means are provided for driving the platform along the rails to properly position the washer behind the particular trailer to be cleaned.

The second feature disclosed in the McMahan application is the recognition that different water volumes should be used for the various cleaning cycles. It is disclosed that the water flow rates ranging from about 50 to about 200 gallons per minute may be used. These water flow rates are substantially larger than those employed in the other prior art machines mentioned above and provide the McMahan apparatus with important cleaning advantages. A typical process using the McMahan system would employ a volume of about 200 gallons per minute for the washing step and only about 100 gallons per minute for the rinse. Since the speed of the carriage and the rotational speed of McMahan's nozzles remain constant, the extraordinarily high water volume causes a blasting effect on the interior surface of the trailer resulting in very efficient cleaning.

While the high water volumes used in McMahan may appear to be a radical departure from the other prior art systems, the departure does not result in a significantly more costly cleaning process because of McMahan's recirculation capability. New water is added to the system only for the rinse cycle, so additional water costs are minimal. Moreover, the efficient heating system for both wash and rinse solutions requires only minimal additional heat input. Most importantly, however, it now appears that the high water volumes and resultant increased pressure may be necessary to achieve the thoroughness of cleaning required by proposed regulations.

While McMahan's system does represent a significant improvement over the other types of carriage-mounted cleaning systems, it still has several disadvantages. First, the valve systems for providing different water volumes to the nozzles were not completely satisfactory. Precise control was difficult to achieve. Second, the hose arrangement of McMahan, with the hose reel on the dock, subjected the hose to unnecessary wear as the carriage dragged the hose into the trailer body. Also, the types of hoses required for delivering up to about 200 gallons of water per minute under high pressure are quite bulky and the hose had a tendency to pile up and foul the hose reel during winding. Third, the McMahan device did not satisfactorily flush the debris from the floor of the trailer, even if the trailer was sloped downwardly toward the carriage dock.

An improved trailer cleaning apparatus which overcomes the above-noted disadvantages of the prior art would represent a significant advance in this technology.

OBJECTS OF THE INVENTION

It is a primary object of the present invention to provide a carriage-mounted container washer and associated water supply, heating and circulation systems which overcome the above-noted disadvantages of the prior art.

It is another object of the present invention to provide a carriage-type container washer having rotating nozzle means and a water system for supplying heated water under pressure to said nozzles, said water system further including valve and control means for selectively regulating the volume of water supplied to said nozzles per unit of time.

Another object of the present invention is to provide a hose reel on said carriage, said hose reel being adapted for smoothly winding a hose, and means coupled to said hose reel for winding said hose in a controlled manner to prevent fouling of the reel.

Still a further object of the present invention is to provide a container washer which includes both rotating nozzles for cleaning the interior of a container and a spray bar for washing of debris from its floor.

Another object of the present invention is to provide a carriage-type cleaner supported on a dock which includes a pan for receiving water spilling from the floor of the container, the pan having tilting means for properly positioning the pan and for facilitating cleaning of same.

A further object of the present invention is to provide a diversion valve for selectively directing water from a high pressure hose to either nozzles or a spray bar.

Yet another object of the present invention is to provide a dock for a carriage-mounted trailer washer which permits cleaning of the insides of the trailer doors as well as the interior of the trailer body.

How these and other objects of the present invention are accomplished will be described in the following specification taken in conjunction with the Figures. Generally, however, the objects are accomplished by an apparatus which includes a tank assembly including wash and rinse water tanks and a burner for heating the water in the wash and rinse tanks. A pump is coupled to the tanks for selectively delivering water from either tank to a hose. Also coupled intermediate the pump and the hose is a specially designed valve control. The valve control is movable to any of a plurality of positions to regulate the amount of water entering the hose. A wash cart assembly is also provided. The cart includes a wheeled carriage supporting a hose reel, nozzles and a spray bar having spray nozzles directed downwardly and rearwardly.

The hose reel is designed to freely unwind hose as a motor coupled to the wheels of the cart (and the nozzles) drives the cart into the container. For rewinding of the hose, the reel is interconnected with the drive motor through special clutch means whereby the hose is rewound as the cart is backed out of the container. The reel itself includes a spiral fin and a guide to prevent piling up or fouling of the hose windings. The cart assembly also includes a diversion valve for selectively directing water to the spray bar instead of the nozzles, the diversion valve relying primarily on water pressure to define the desired water flow path. Finally, a dock for supporting the cart includes a raised platform and guide channels for directing the cart into the container. The raised platform makes it possible to use the cart for washing the insides of trailer doors. The dock, in the preferred embodiment, also includes a tip-pan for receiving water draining from the container. It includes a screen for removing large impurities from the water spilling from the container and it can be moved to two operating positions by a cylinder mounted to the dock and having a piston rod engaging the rear of the pan. One position is beneath the opening of the container in which position the pan can receive liquid flowing therefrom, while the second position is a tilted one to facilitate easy cleaning of the pan. Various embodiments of the present invention are described in the following specification, all of which are deemed to fall within its scope.

DESCRIPTION OF THE PREFERRED EMBODIMENT

Figure 1:
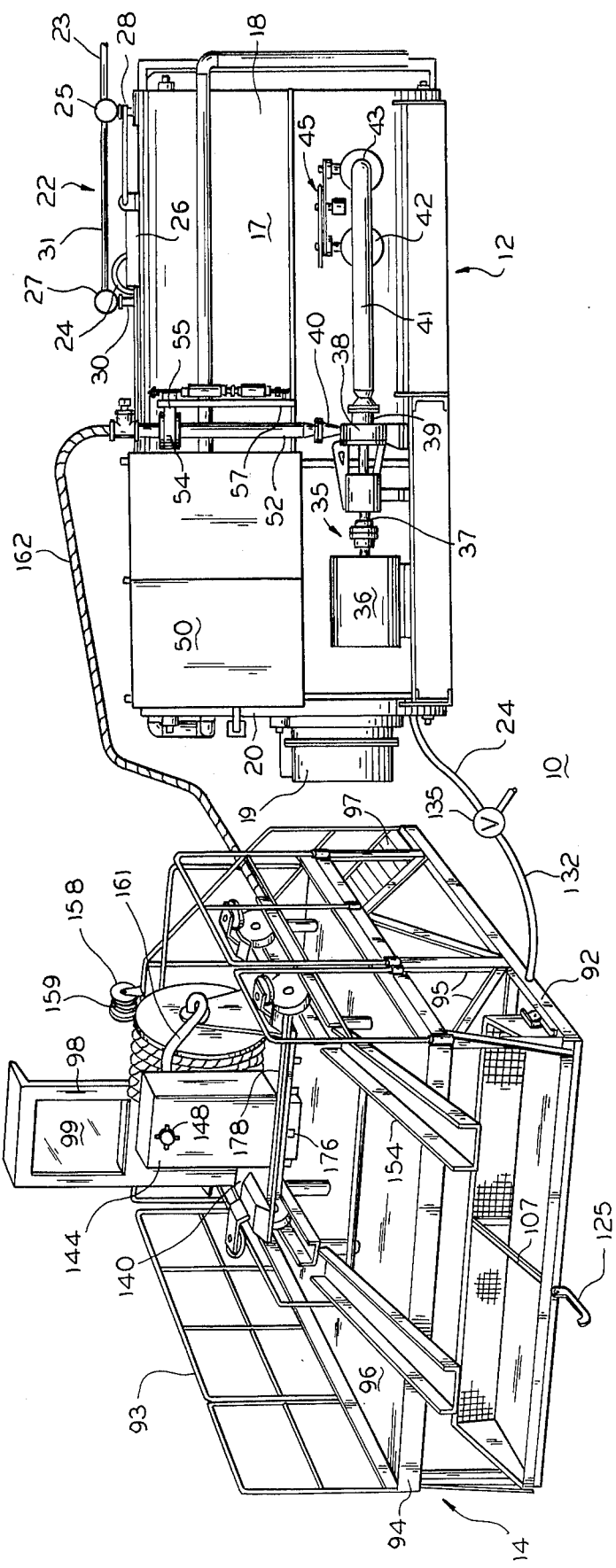
FIG. 1 is a perspective view of the tank, cart and dock assemblies according to one preferred embodiment of the present invention.

FIG. 1 shows a preferred form of a container washing apparatus 10 according to the present invention to include three major components: a tank assembly 12, a dock assembly 14 and a wash cart assembly 16, each of which will be separately described hereinafter. Before proceeding with a detailed description of the preferred embodiment, some general comments should be made to explain the adaptability of apparatus 10 to various washing environments and to explain some general modifications which can be made by one skilled in the art after reading the present specification. These modifications are deemed to fall within the scope of the present invention.

First, the illustration of the invention with reference to a trailer washing system is for purposes of illustration rather than limitation. The invention can be readily adapted for cleaning other types of containers, such as boxcars and the like. Another type of container with which the invention is particularly well suited is shipping containers used to haul freight in ships. Such containers are shaped similarly to truck trailers and only slight modifications of the disclosed embodiment will result in a shipping container wash system.

Second, the process disclosed herein can be variously modified to fit the requirements of a specific cleaning job. For example, while a four cycle system is described in detail hereafter, more or less cleaning operations may be necessary. In addition, the water volumes discussed in connection with apparatus 10 are purely illustrative and the volumes may be adjusted by slight modification of the valve control described later. Also, the particular dock assembly 14 is one designed especially for use with standard over-the-road trailers. It will be apparent after reading the specification, that the height and configuration of the dock can be variously modified. For example, while the illustrated dock includes a separate sump and water purification system, the tank assembly 12 and cart assembly 16 can be employed on a permanent dock or with any of the various special dock configurations described in the aforementioned McMahan application, Ser. No. 785,196.

Tank assembly 12 includes an elongate, generally cylindrical water tank 17 which is covered by a layer of suitable insulation 18, such as a layer of urethane foam covered by a fiberglass shell. While not shown in the drawings it should be recognized that the tank is divided by a bulkhead plate to form separate chambers for containing the wash and rinse solutions. A burner, 19, is mounted into a first end 20 of the tank 17. The burner may be gas or oil fired or the water may be heated electrically. The power supply and fuel lines for burner 19 are not shown and neither are the appropriate thermostats for activating burner 19 to maintain the desired temperature in the wash and rinse tanks. A fire chamber (not shown) passes longitudinally through the wash tank and known systems of heat exchange may also be included to increase the efficiency of the tank heating means. The rinse water contained on the right-hand side of tank 17 also is heated by the heat passing through the bulkhead.

A make-up water supply system 22 is mounted to the top of tank assembly 12. The system 22 includes a fresh water inlet pipe 23 and two valves 25 and 27. Valve 25 is coupled to the fresh water inlet pipe 23 and to two other pipes 28 and 31. Pipe 28 communicates with the interior of the rinse chamber while pipe 31 passes between valve 25 and valve 27. Coupled to valve 27 is a pipe 30 which communicates with the interior of the wash tank.

From this description, it will be apparent that fresh water can be added to the rinse tank by opening valve 25 between pipes 23 and 28. Fresh water is added to the wash tank by opening valve 27 and by opening valve 25 between pipes 23 and 31. As will be discussed in greater detail later water may be added to the wash tank using the invention's recirculation capacity through a hose 24 which empties into a manhole 26 at the top of the wash tank.

Not shown in the drawings are the controls for the valves 25 and 27 which preferably are electric. The valves respond to appropriate level sensors in the two tanks so system 22 may operate automatically. As will be seen later, the 24 for the water includes a separate valve 135 for diverting water to a sewer or back to the wash tank return hose 24 depending on the wash cycle.

FIG. 1 also shows a pump assembly 35. The pump assembly 35 is mounted to the side of the tank assembly 12 near its bottom at the end 20 thereof. Pump assembly 35 includes a motor 36, a drive shaft 37 and a pump mechanism 38. An inlet 39 for water is provided at the right side of pump mechanism 38 and an outlet 40 is located at its top.

Water is drawn from tank assembly 12 through a manifold assembly 41, a first end of which is bolted to inlet 39. The other end of manifold assembly 41 includes two branches 42 and 43 coupled respectively to the wash and rinse chambers of tank 17. Flow to the manifold is controlled by a valve assembly 45 mounted to branches 42 and 43 between the connections to tank 17. The valve assembly 45 is operated automatically in the process soon to be described.

The particular type of valves employed for valves 25 and 27 and in valve assembly 45 are not critical to the present invention and in and of themselves form no part of the present invention. However, at this point in the description of the invention, it will suffice to say that the valves are mechanical and are activated by solenoids coupled to electrical relays which are part of the dock assembly 14 and cart assembly 16. The relays and the part they play in the cleaning process will be more fully described below.

An electrical control panel 50 is also provided for apparatus 10 and is mounted to tank assembly 12 above pump 35. The details of the control panel will not be described in this specification, but it contains a plurality of relays energized by switches on the dock and cart assemblies to activate the cart drive motor in forward and reverse directions as well as the pump assembly 35 and electrical valves. Moreover, the control panel 50 includes electrical means for operating the water valve control system now to be described.

The outlet 40 of pump assembly 35 is coupled to a vertical pipe 52 which extends from pump assembly 35 to a location just above tank assembly 12. Adjacent the top of pipe 52 is a butterfly valve 54, the valve 54 being operated by a stem 55 to regulate the flow of water through pipe 52. Stem 55 extends generally toward the right side of tank assembly 12 or away from control panel 50. Stem 55 passes perpendicularly through a support plate 57 rigidly secured to valve body 54, adjacent to but slightly to the right of pipe 52.

Figure 2:
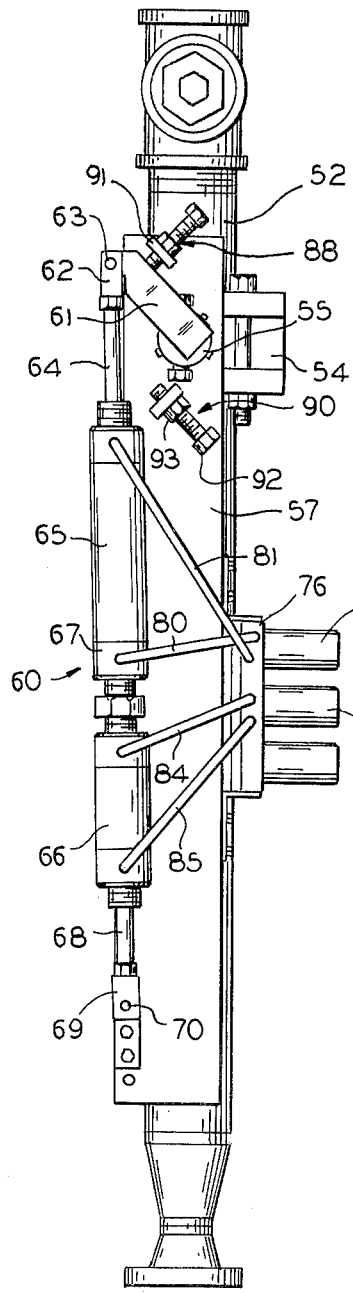
FIG. 2 is a side view of a water volume valve control used with the tank assembly of FIG. 1, the valve control being in a first position.
Figure 3:
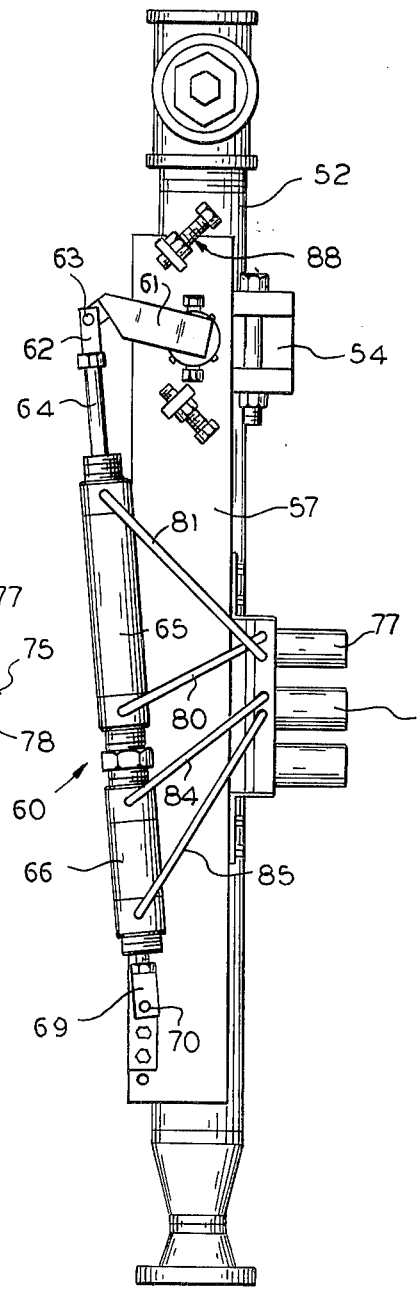
FIG. 3 is another side view of the valve control of FIG. 2, said control being in a second position.
Figure 4:
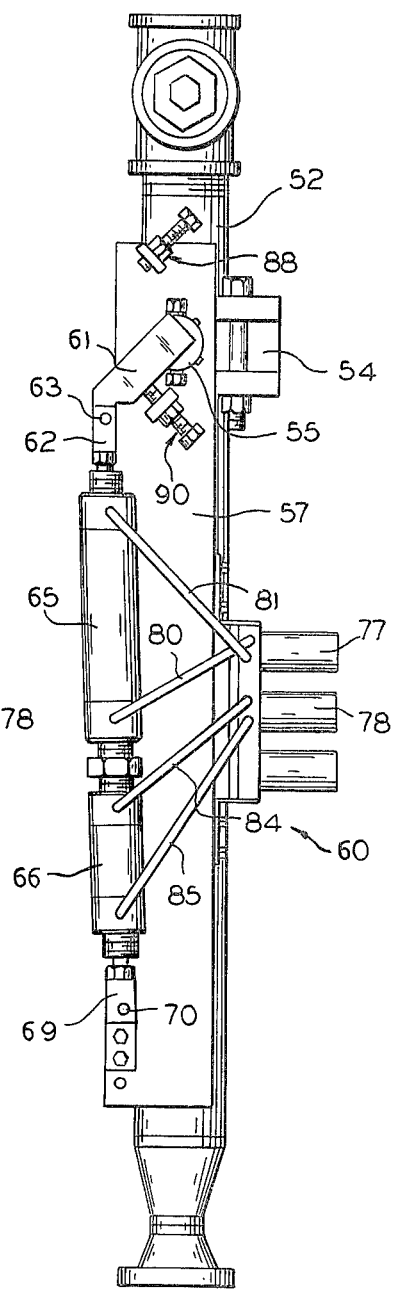
FIG. 4 is yet another side view of the valve control of FIG. 2, said control being in a third position.

Affixed to support plate 57 is the valve control assembly 60 which can best be understood by reference to FIGS. 2-4. FIGS. 2-4 are side views looking from the right side of assembly tank 12, pipe 52 and butterfly valve 54 being only partially visible. The free end of stem 55 is attached to a lever arm 61 which may be several inches long, and is perpendicular to the axis of stem 55, rotation of arm 61 about the axis of stem 55 regulating the opening of butterfly valve 54 and in turn the flow of water through pipe 52. An upper piston rod coupling bracket 62, is pivotally connected by pin 63 to the free end of lever arm 61 which in turn receives the end of piston rod 64 of a first pneumatic cylinder 65. A second cylinder 66 is butt-coupled to the butt end 67 of cylinder 65. The second cylinder 66 is shorter than first cylinder 65 and is oriented with its piston rod 68 directed downwardly toward pump assembly 35. The end of piston 68 is coupled to a lower piston rod coupling bracket 69 which in turn is pivotally connected by pin 70 to the lower end of support plate 57.

Mounted on the rear of support plate 57 is a compressed air control system 75. A source of compressed air (not shown) is coupled to system 75 which includes an air manifold 76 and a pair of solenoid valves 77 and 78 for controlling the flow of compressed air therethrough. Two flexible hoses leave solenoid 77. The first hose 80 is coupled to the butt end of cylinder 65 while the second hose 81 is coupled to the top of cylinder 65. It thus can be seen that if solenoid 77 is opened to charge the cylinder 65, air is injected through hose 80 and removed through hose 81 to extend piston 64 to its position shown in FIG. 1. Piston 64 may be retracted by switching solenoid 77 to reverse the flow of air, in which case the piston rod 64 is retracted within cylinder 65.

Likewise, a pair of hoses 84 and 85 is coupled between solenoid 78 and small cylinder 66. Hose 84 is to supply compressed air to the butt end of cylinder 66 to extend piston rod 68. Hose 85 is the discharge hose and the rest of the cylinder charge and discharge system work similarly to that just described for large cylinder 65.

The final components of valve control 60 include a pair of adjustment stops 88 and 90 located generally above and below stem 55. Each of stops 88 and 90 includes a small plate 91 welded perpendicularly to support plate 57, a threaded hole (not shown) through each plate 91, a bolt 92 passing through the holes and a lock nut for securing bolts 92.

Now that the components of control 60 have been described, its operation can be explained. In FIG. 2, both pistons 64 and 68 are fully extended and lever arm 61 is urged against upper stop 88. The position shown in FIG. 2 represents the most closed position of butterfly valve 54 and thus the position in which the smallest volume of water is permitted to pass through pipe 52.

FIG. 3 shows lever arm 61 in a second position, i.e. between stops 88 and 90, to partially open the butterfly valve 54. The movement is accomplished by operating solenoid 78 whereby compressed air is forced into cylinder 66 through pipe 85 while the air in the cylinder is discharged through hose 84. The piston rod is fully retracted into the cylinder 66. This results in the distance between the coupling bracket 62 and 69 being shortened thus pulling down on the free end of lever arm 61.

A third position of the valve control 60 is shown in FIG. 4. Here, the lever arm 61 is pulled down into contact with bottom stop 90, such movement being accomplished by retracting piston rod 64 into cylinder 65 by forcing air into hose 81 and removing air from cylinder 65 through hose 80. In this configuration, the butterfly valve 54 is opened still further thus allowing unrestricted flow of water through pipe 52.

An examination of FIGS. 2-4 indicates that the system has a number of other capabilities for fine adjustment for valve 54. Accurate control of the distance between brackets 62 and 69 is provided by the adjustable stop means 88 and 90 and further by the threaded coupling between the piston rods and their respective coupling brackets. Further, while not shown in the figures, a further position could be provided wherein piston rod 68 is extended (as in FIG. 2) while the piston rod 64 is retracted (as in FIG. 4) to result in a lever arm 61 position intermediate that of FIGS. 3 and 4. Since only three water flow rates are utilized in the preferred embodiment of the present invention, only three positions are illustrated and the operation of valve control 60 will be further described in the later section of this specification dealing with the operation of trailer washer apparatus 10.

Attention should next be directed to FIGS. 1 and 5-7 for a description of dock assembly 14. Assembly 14 generally comprised of a metal framework for supporting cart assembly 16 at a proper height to enter the container to be washed, e.g. in the illustrated case a trailer.

Dock assembly 14 includes a generally rectangular bottom frame 92 and a generally rectangular top frame 94 spaced apart and above frame 92 by a plurality of support and brace struts 95. A deck 96, preferably constructed from expanded steel, is supported on frame 94, the deck in turn supporting the cart assembly 16 as will be more fully described hereafter.

The deck 96 is perforated to allow any water which may fall thereon to pass through to the floor and the expanded metal form of deck provides the additional advantage of being a slip proof surface for the machine operator. Access to the deck is provided by a stairway 97 at the rear of assembly 14 and for safety purposes a guard rail 93 is secured about deck 96 on all sides of assembly 14 except that facing the container. Also shown in FIG. 1 is an operator protective shield 98 which includes a glass or transparent plastic window 99. When standing behind shield 98, the operator is given a clear view of cart assembly 16 throughout the cleaning operation and at the same time is protected by shield 98 from spraying water. Not shown in FIG. 1 is a button panel mounted on the rear side of shield 98 from which the operator maintains complete control over the cleaning cycles of apparatus 10.

Figure 5:
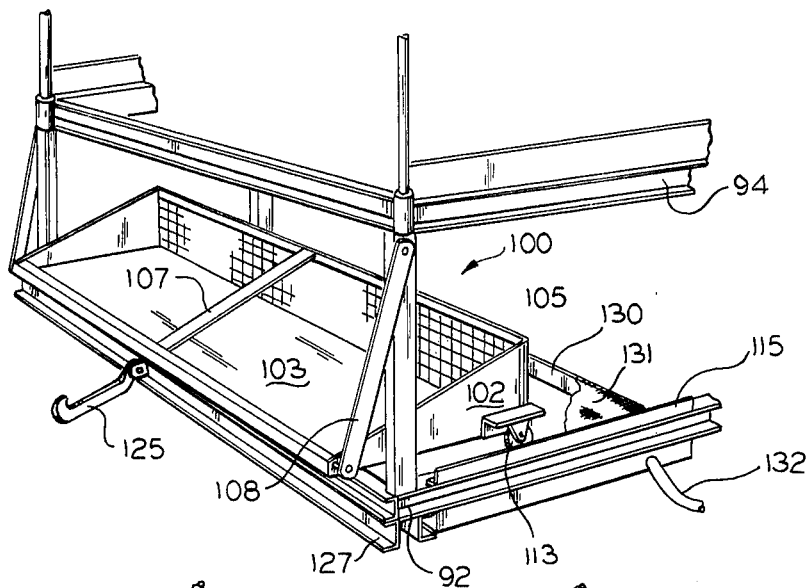
FIG. 5 is a perspective view of a portion of the dock assembly shown in FIG. 1, showing the tip-pan in its storage position.
Figure 6:
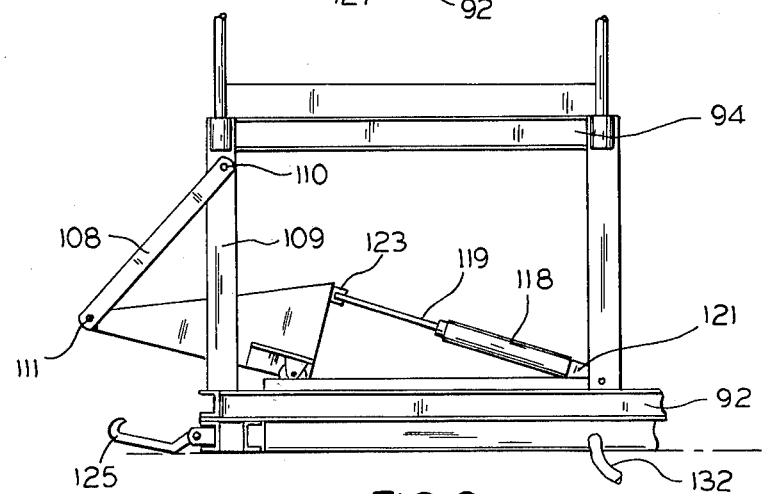
FIG. 6 is a partial side view of the dock assembly shown in FIG. 5, the tip-pan being in its liquid receiving position.
Figure 7:
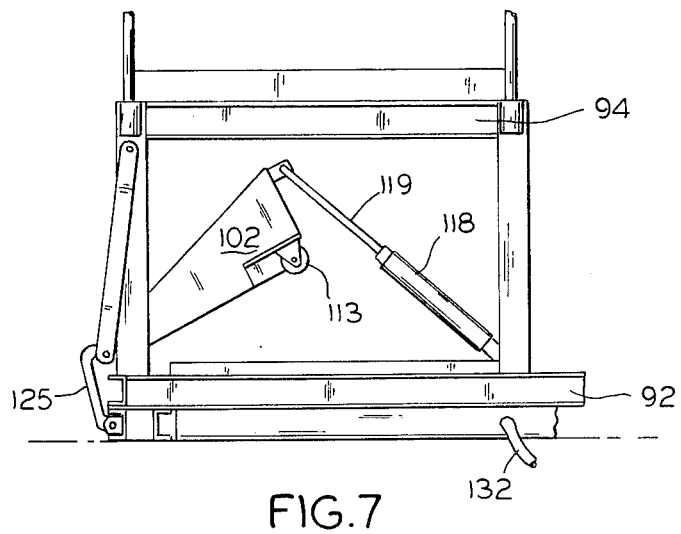
FIG. 7 is another partial side view of the dock assembly shown in FIG. 5, the tip-pan being in its cleaning position.

FIGS. 5-7 are detailed side views of the front portion of dock assembly 14, with some of the support members 95 removed to provide a clearer picture of the tip-pan 100 and its operating components and method of operation. Pan 100 extends across the front of dock assembly 14 and is generally triangular in cross section. It is constructed from two triangular metal end pieces 102, a solid metal rectangular bottom 103 and a generally rectangular back 105. Back 105 is in turn prepared from screen material having average openings of about ⅜". A cross strut 107 is provided between the middle of the top of back 105 and the front of bottom 103 to enhance the physical integrity of pan 100.

Pan 100 is supported on dock assembly 14 by a pair of elongate plates 108, one of which is pivotally connected respectively to the outside edge of the front support leg 109 of dock assembly 14 and to the front corners of tip-pan 100 respectively. The plates are attached by pins 110 and 111. The rear of the tip-pan 100 is also supported on dock assembly 14 in some of its operating positions by a pair of rollers 113 mounted respectively to the outside of end pieces 102 adjacent the bottom rear corners thereof. Rollers 113 are constructed and arranged for rolling movement along a track 115 located at the front portion of the side members of bottom frame 92. Track 115 is actually a portion of the sump pan soon to be described.

Other components of the tip-pan 100 include a pneumatic cylinder 118 including a piston (not shown) and a piston rod 119. The closed end of cylinder 118 is pivotally mounted to a bracket 121 on bottom frame 92 at the middle of cross bar 120 (shown in FIG. 5) while the end of piston rod 119 is pivotally connected to the top of back 105 midway between end pieces 102. The latter coupling is to a bracket 123. While not shown in the drawings it should be apparent that fluid supply and discharge lines are provided for cylinder 118 as well as control means (not shown) for extending or retracting piston rod 119. Finally, a latch hook 125 is secured to the base frame 92 at the middle of the front cross bar 127. Hook 125 is constructed and arranged for being movable to a locking position shown in FIG. 7 in which the hook secures the front edge of bottom 103 relative to frame member 127. Two hooks could alternately be mounted on side members 109 for engaging plates 108 if desired.

The three positions of pan 100 can now be explained by reference to FIGS. 5-7. In FIG. 5, pan 100 is shown in its retracted position under deck 96. In this position, the pan is out of the way of the front of dock assembly 14 to allow a trailer or other container to be moved close to the front of dock assembly 14.

After a trailer or other container is in its cleaning position, the piston rod 119 is extended. Such extension pushes the back of pan 100 forward on rollers 113 and simultaneously causes the front edge of pan 100 to tilt upwardly about a circular axis defined by pins 110 and having a radius equal to the length of plates 108. In the position shown in FIG. 6, the pan is ready to receive liquid and any entrained solids spilling from the container during the washing and rinse cycles. Liquids spill from the back edge of bottom 103 while any larger particles are filtered therefrom by the screening of back 105.

In FIG. 5 it can be seen that a sump pan 130 is provided beneath tip-pan 100. Sump pan 130 is a rectangular open topped pan and includes a cloth filter 131 across its top and an outlet hose 132. It can be appreciated that the liquid draining from tip-pan 100 passes through the cloth filter 131 for further purification and is pumped by a sump pump (not shown) in the sump pan 130 through hose 132 for being returned to wash tank refilling hose 24. A diversion valve 135 is also visible in FIG. 1. This valve, is provided to divert water from the sump 130 to a drain or sewer (not shown), during certain operating cycles. Further discussion of the use of this valve in the cleaning process will be deferred until a later section of this specification.

Referring next to FIG. 7, the tip-pan 100 is shown in its tilted or cleaning position. To accomplish this result the pan is allowed to return to its retracted position, i.e. to the position shown in FIG. 5. Hook 125 is then locked about the front edge of pan 100 and cylinder 118 is then charged. Because pan 100 is no longer able to pivot about axis 110, the piston rod 119 forces the rear of pan 100 upwardly. In this position, debris removed from the water by screen 105 may readily be scraped into a suitable receptacle (not shown) for proper disposal.

The tip-pan 100 just described provides numerous advantages over drain systems known to the art. Spillage is greatly reduced because the pan is controllably located at the correct height and lateral position. Cleaning is facilitated by the tip feature and the entire water purification procedure is accomplished by a system which is readily accessible for required cleaning and repair. Furthermore, the system is readily adaptable for docks of different heights and widths.

Dock assembly 14 may also be movable by providing a plurality of wheels, e.g. at its corners. Some trailer washing stations may require movable docks and such docks are deemed to fall within the scope of the present invention.

The cart assembly 16 of the present invention will be described by reference to FIGS. 1 and 8-9. The novel features of assembly 16 will be described in the following part of the specification, but some parts of the cart will be only generally described because the cart incorporates a number of basic features described in the aforementioned McMahan patent and applications, which patent and application are expressly incorporated herein by this reference.

Cart assembly 16 includes a rectangular frame 140 supported on four wheels 142 for being driven into and out of the container to be washed. A housing 144 is mounted forwardly on cart assembly 16 and contains an electric motor (not shown). The motor is connected by suitable sprockets, drive chains and gear reducers to both the front and rear wheel axles 145 to drive the machine. The figures show that assembly 16 includes four lateral spacing wheels 147 to insure proper alignment of the cart within the trailer 150 (see FIG. 9).

As explained in the McMahan application, housing 144 also supports a set of rotating nozzles 148 mounted on its front side, the nozzles 148 also being coupled to the motor for being rotated at a controlled rate as the cart is being moved into and out of the trailer. The connection between the rotating nozzles 148 and the wheels 142 insures that the water issuing from the nozzles reaches every area of the interior of trailer 150. A spiral water stream is created by the rotating nozzles and the cart speed and rotational speed of the nozzles insures that the water sprays against the interior of approximately one inch centers in a spiraling pattern.

The cart assembly 16 itself is supported on a pair of elongate, parallel channel track members 152 each of which members is in turn supported on deck 96 by three cylindrical support columns 153 about one foot above the deck. Additional channel members 154 are pivotally connected to the front of track member 152. Additional members 154 are provided for being lowered or raised to rest on the floor 155 of trailer 150 to allow the cart assembly 16 to enter the container. It will be noticed in the figures that the members 154 include diverging sides so that the free end of the members are substantially wider than the end connected to tracks 152. This feature allows the cart assembly 16 to reenter the dock area even if there is some misalignment during longitudinal movement thereof back and forth in the trailer.

It should also be mentioned that the elevation of cart assembly 16 above deck 96 is for a useful purpose, i.e. to allow the inside of the trailer doors to be washed. For standard trailers, the deck is constructed to be just slightly lower than the floor of the trailer, so that the doors can be swung out parallel to one another inside the guard rails 99. A splash shield (not shown) can be provided over the top of the doors to contain the water spray, and as the cart moves out onto members 154 the doors will be washed.

Two reels are also shown in FIG. 1. The first reel 158 is an electric cable reel and is mounted to the dock assembly adjacent operator shield 98. Reel 158 is a spring loaded reel and contains a electrical cable 159 coupled to a source of power (not shown) and to the drive motor and controls within housing 144. As the cart assembly 16 enters the trailer, cable 159 is unwound from reel 158 and on the return trip, the cable 159 is automatically rewound onto the reel.

The second reel 161 is for the water hose 162. Hose 162 is coupled to the top of pipe 52 of the tank assembly 12 for receiving water under pressure, and for purposes of description may be a 2" I.D. high pressure water hose. Hose 162 passes under the deck assembly 14 and upwardly through deck 96 at the rear thereof, is wound about reel 161 and terminates at a swivel coupling 163 at the axis of reel 161. A second short hose 165 is coupled between swivel coupling 163 and a valve (to be described later) within housing 144.

Hose reel 161 is rotably mounted between a pair of stanchions 167 and also includes a sprocket 168, and a self engaging clutch (not shown) for coupling the sprocket for rotation with the hose reel 161. The clutch is not engaged during forward movement of cart 16. Cart assembly 16 in its forward cycle will freely unwind hose 162 from reel 161 to lay the hose on the floor 155 of the trailer. When the assembly reaches its forward-most point of travel, the clutch is self-engaged to couple chain 170 to a sprocket 169 which in turn is connected to the drive motor. As the cart is leaving the container, hose is rewound onto reel 161, but an important feature of the present invention is that the rewind speed of hose reel 161 slightly exceeds the longitudinal speed of the cart. A slip clutch is provided in housing 144 to compensate for the difference in winding speed and to insure that the hose 162 is being wound at a proper rate.

Hose 162 used in the present invention is quite heavy and the mechanism just described has significant advantages over other prior art systems. For one, the system does not drag hose along the trailer floor as was the case in the McMahan system (with the reel mounted on the dock), a feature which increases hose lifetime and avoids costly shut downs for hose repair or replacement. Also, the system provides the cart assembly with additional traction since the heavy reel and hose are mounted on the cart. Furthermore, hose rewinding at the controlled speed reduces fouling of the hose and hose slack.

Figure 9:
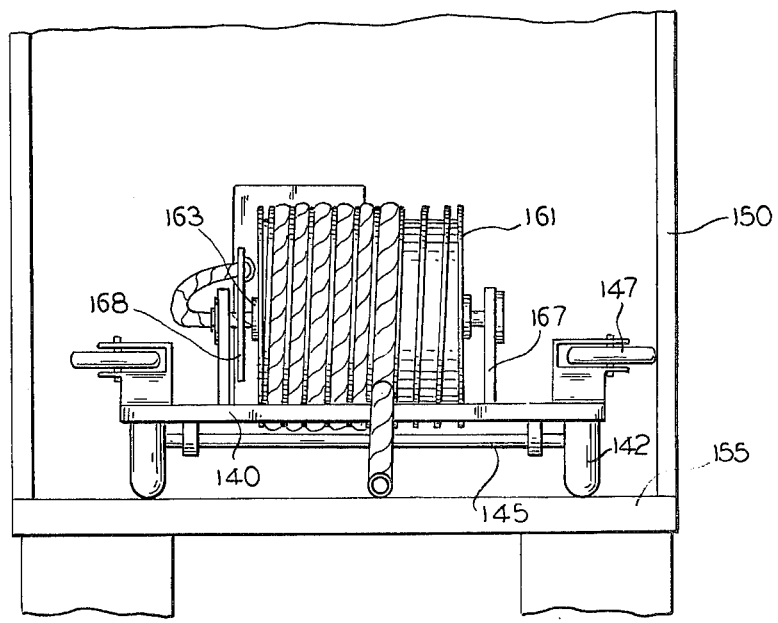
FIG. 9 is a rear elevation showing the cart of FIG. 8 entering a trailer for cleaning.

The final component of the hose reel 161, which is best seen in FIG. 9, is the spiral divider 172. The reel 161 includes a cylindrical drum 173 about which is welded a divider 172 in spiral form. The divider 172 is a thin plate about 2 inches high and the spiral itself has separations of about 2 inches. This novel hose reel arrangement insures that hose 162 is wound in a precise pattern about the reel to overcome the prior art problems of piling up of hose windings and hose fouling. Hose guide rollers may also be provided, it being preferred that movement of the guide rollers be controlled by engagement into the divider fins.

Figure 8:
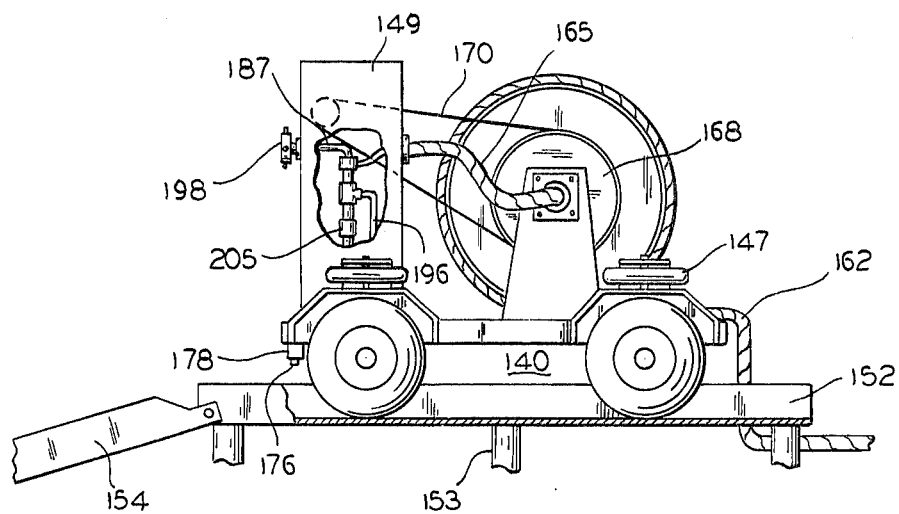
FIG. 8 is a side view of a wash cart according to the preferred embodiment of the present invention with parts broken away.

Reference should next be had to FIGS. 1 and 8 wherein a spray bar 175 can be seen. Spray bar 175 is a generally square, hollow tube mounted at the front end of cart assembly 16 and preferably as part of frame 140. A plurality of nozzles 176 are provided on spray bar 175, the nozzles 176 being directed generally downwardly and rearwardly. A coupling, not shown is provided adjacent the middle of spray bar 175 for providing water thereto in a manner which will soon be described.

Figure 10:
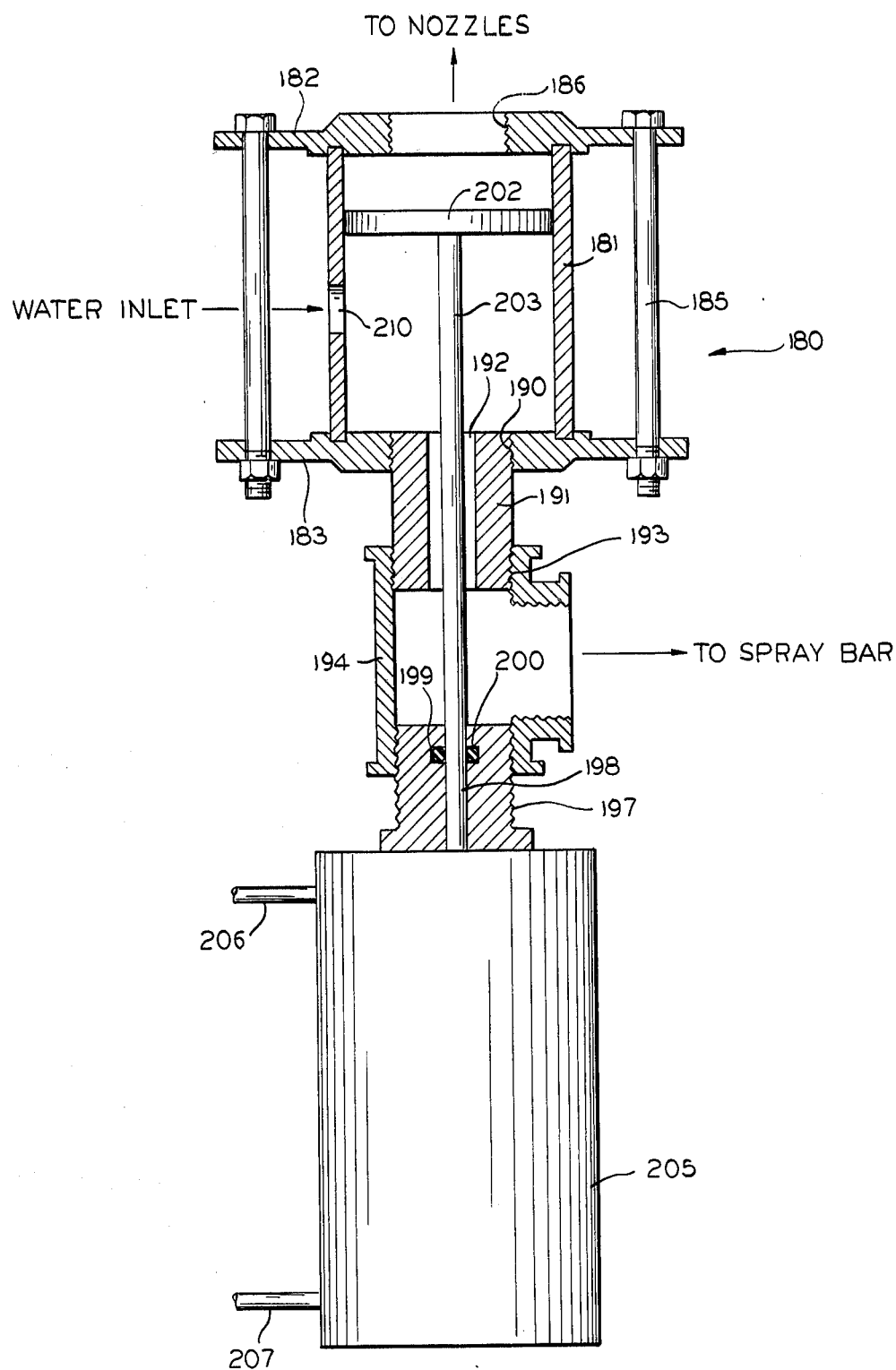
FIG. 10 is a cross section view of the diversion valve employed in the preferred embodiment of the present invention.

By reference to FIGS. 8 and 10, the diversion valve 180 for selectively directing water to either nozzles 148 or to spray bar 175 can be appreciated. The valve 100 includes a generally cylindrical housing 181 closed at its upper end by a first plate 182 and at its lower end by a second plate 183. Each of plates 182 and 183 include an outwardly extending flange through which bolts 185 are perpendicularly secured to lock the valve assembly 180 together.

A threaded opening 186 is provided at the center of top plate 182 and a pipe 187 is coupled between opening 186 and a swivel water coupling (not shown) behind nozzles 148. The bottom plate 183 likewise includes a threaded opening 190 into which a pipe 191 is receivable mounted. Pipe 191 includes a cylindrical opening 192 there through and threads 193 on its lower end. Coupled to the lower end of pipe 191 is a T-connector 194, the T-base extending perpendicularly to the axis of housing 181 and receiving another hose 196 which is connected to the spray bar 175 just described. The lower portion of the connector 194 receives a threaded plug 197 which includes a small cylindrical opening 198 surrounded at one location by an annular recess 199 which in turn receives an O-ring sealing member.

Finally, a piston 202 is provided in housing, its rod 203 extending downwardly through pipe 191, connector 194, plug 197 (being sealed thereto by O-ring 200). Piston rod 203 enters a hydraulic cylinder 205, having an inlet hose 206 and a discharge hose 207 connected thereto. Hoses 206 and 207 are connected to the water supply (not shown) and a solenoid. Cylinder 205 also includes a piston (not shown), movement of which will cause movement of the piston 202 within water housing 181. A water inlet 210 is provided at approximately the middle of housing 181 which in turn is coupled to hose 165 for receiving water after it leaves the hose reel.

The operation of valve assembly 180 will now be explained. Assume first that the cleaning cycle requires that water be delivered to nozzles 148. Cylinder 205 is charged through pipe 206 causing retraction of rod 203 and the lowering of piston 202 below the level of the water inlet 210. Because the water entering the housing 181 does so under very high pressure, the water will force the piston downwardly to seal the piston against the top of pipe 191. Water will then leave the housing through opening 186. On the other hand, if it is desired to employ the spray bar, cylinder 205 will be charged through pipe 207 forcing piston 202 toward opening 186. Once again water pressure will urge the top of piston 202 against opening 186 causing water to leave housing 181 through opening 192 of pipe 191 and out the connector 194 to the spray bar. The use of water pressure to affect the ultimate seal in valve assembly 180 represents yet another significant feature of the present invention and a substantial improvement over other types of valves which rely entirely on pneumatic control.

The operation of apparatus 10 can now be described in detail with reference to the preferred operating parameters and processing sequences. The explanation will begin with apparatus 10 in its position shown in FIG. 1, except that channel members 154 will be raised to a vertical position. A trailer 150 positioned up to the front of dock assembly 14, at which time, the channel members 154 are lowered so that the free ends thereof rest on the floor 155 of the trailer 150. At this point cylinder 118 is charged to cause extension of piston rod 119. Since the locking member 125 is not attached, tip-pan 100 will be moved from the position shown in FIG. 5 to the extended position shown in FIG. 6 for receiving liquids and solid debris from the trailer.

If it is desired to clean the doors (not shown) of trailer 150, the doors would be opened so that they would be parallel to one another and would extend over deck 96 toward the operator station 98.

For purposes of this description, it will be assumed that a meat hauling trailer 150 is to be cleaned and that the wash and rinse tanks are filled with detergent solution at a temperature of about 180° F. and clean rinse water at a temperature of about 100° F., respectively.

The cleaning operation itself is started by the operator pushing a "start" button on his control panel behind shield 98. The drive motor within housing 144 begins to drive the cart assembly toward the front of trailer 150 at a rate of about 30 feet per minute, the cart proceeding along the channel members 154 and nozzles 148 being rotated at the pre-selected rate. When the cart assembly reaches the location where the nozzles 148 are within the area defined by the back of the doors (or when the nozzles are between the back edges of the sides of trailer 150 if the doors are not to be cleaned), a switch means (not shown) activates the pump assembly 35 to start the flow of water through hoses 162 and 165 to the nozzles. The switch may be a mechanical switch located on channel 152. The valve 180 is in a position wherein water is directly out opening 186 toward the nozzles. During this initial trip of the cart into the trailer, the butterfly valve 54 is in its most closed position (FIG. 2) and in the preferred embodiment of the invention permits about 50 gallons of water per minute to pass through pipe 52. Also, on this initial trip the water supplied to nozzles 148 is taken from the wash container of tank assembly 12 by appropriate adjustment of valve assembly 45 to permit water to enter manifold 41 through the branch 42 thereof communicating with the wash tank.

As the cart travels to the front of trailer 150, the entire trailer interior is soaked with water and detergent and even the limited volume of 50 gallons per minute applied to the trailer interior during the approximately 2 minute first trip consumes about 100 gallons of hot water. This water drains from the floor of trailer 150 and spills into tip-pan 100 where it is preliminary filtered by screen 105 and further filtered by cloth 131 before being received in sump 130. As mentioned above, it will be assumed that this pre-wash water is quite dirty and valve 135 would typically be opened to the sewer or drain for disposal of the water.

When the cart 16 reaches the front wall of trailer 150 a series of events are initiated by a switch on cart assembly 16. First, the diversion valve 180 is operated to shut off water flow to the nozzles and initiate water flow to the spray bar nozzles 176. Second, the valve control system 60 is operated to increase the water flow by moving the lever arm 61 to the position shown in FIG. 3 (in the preferred embodiment this position representing a water flow of about 100 gallons per minute). Third, the cart drive motor is engaged with hose reel 161 to cause rewinding of the hose 162 onto the reel while the motor begins to drive cart assembly 16 back toward dock assembly 14. The large volume of water used in this step cleans the floor of trailer 150, pushing water and debris back toward the rear of the trailer where it spills out into the tip-pan and is purified in the manner discussed above. The rearward trip of cart assembly 16 takes the same time as the entry trip, and for purposes of this illustration it will again be assumed that the water from the sump is diverted to the drain. Altogether about three hundred gallons of water are consumed in these two steps.

The cart assembly 16 is stopped by sensing switch means (not shown) as the cart reaches the rear of trailer 150, at which time yet another series of changes are automatically initiated by the controls within panel 50. First, the drive motor is reversed to drive cart assembly 16 back into trailer 150. Second, the valve control system 60 is operated to locate the lever arm 61 in the position shown in FIG. 4. In this position, in the preferred embodiment, the pump assembly 35 delivers about 200 gallons of water per minute through pipe 52 to hose 162. Third, the hose reel rewind system is disengaged to allow the hose 162 to be freely unwound from reel 161 during forward movement of the cart. Fourth, the diversion valve system 180 is reversed to direct water to the nozzles 148 (as in the initial pre-wash operation) and finally, the valve 135 is operated to recirculate water from sump 130 to the wash tank within hoses 132 and 24. The two minute wash cycle consumes about 400 gallons of the wash solution which is reclaimed.

The last step in the cleaning operation is the rinse cycle, and in many respects this cycle is similar to the floor washing cycle described above. For example, the cart reversal and hose rewinding operations are identical, as in the movement of valve control 60 to the position shown in FIG. 3, i.e. to the 100 gallons per minute position. However, there are also a number of differences. The present invention incorporates the time-delay mechanism of the aforementioned McMahan application, whereby the switch which stops the forward movement of cart assembly 16 at the front wall of trailer 150 also initiates rinse water flow for a pre-selected time before reverse movement of the cart assembly 16 begins. Valve assembly 45 is activated to switch the flow into manifold 41 from the wash tank to the rinse tank and the flow is continued until the rinse water reaches the nozzles 148. At this time the nozzle rotation is initiated by the cart drive motor and the clean rinse water is sprayed on the front of trailer 150 to cleanse the wash solution therefrom. Details of the time-delay system components and electrical control can be obtained by reference to the aforementioned McMahan application.

The rinse water is recirculated to the wash tank in the manner described in reference to the wash cycle and, of course, the rinse water tank is refilled by the water make-up system 22. The cart assembly 16 returns to its position shown in FIG. 1, the guide channel members insuring proper longitudinal positioning of the cart as it is driven onto the platform. Suitable sensors stop the spray of rinse water as the cart nozzles pass the rear of the trailer doors to prevent splashing of water outside of the wash area and the cart assembly itself is stopped as it reaches its rest position on its support platform.

The cleaning procedure is finished by driving the trailer away from its washing location at which time the tip-pan is lowered. The operator will then check the condition of the tip-pan 100 and, if it requires cleaning, he will lock the front edge of the pan with locking member 125 and re-extend the piston rod 119 of cylinder 118 to tip the pan to facilitate removal of solid debris into a suitable container. The pan is then lowered another trailer is moved into position. In actual practice it is necessary to clean the tip-pan only after several wash procedures.

As indicated above, the process may be variously modified in terms of speed of cart movement, water spray volumes and the number of cycles employed. Appropriate choices can be made after reading this specification and adjusting the parameters to meet the needs of the parameter cleaning job. So while the invention may be variously embodied it is to be limited solely by the claims which follow.

We claim:

1. An apparatus for cleaning containers comprising:
    a carriage mounted cleaner including a frame supported on wheels;
    motor means for driving said wheels and moving said cleaner into and out of a container;
    nozzle means on said cleaner adapted for directing a stream of water toward the interior of said container when said cleaner is therewithin;
    a hose coupled to said nozzle means for supplying water thereto;
    a water supply and pump means for delivering water from said supply to said hose;
    valve means for regulating the flow of water from said supply to said hose; and
    control means for control of said valve means to at least one preselected position to precisely regulate the flow of water through said valve means, said control means comprising at least one cylinder having extensible piston rod means, said piston rod means being coupled to said valve means for causing adjustment of same and regulation of said water flow.

2. The invention set forth in claim 1 wherein said valve means includes a stem rotatable between a first position in which said valve means is closed to water flow and a second position in which said valve means is open to allow water to flow unrestricted therethrough and wherein said control means is coupled to said stem means for rotating same to at least one position intermediate said first and second positions.

3. The invention set forth in claim 2 wherein said piston rod means is coupled to said stem means through lever arm means for rotating said stem means to said intermediate position when said piston rod means is fully extended or fully retracted.

4. The invention set forth in claim 3 wherein said control means comprises two of such cylinders, axially disposed with their piston rod means oppositely directed, means for selectively and individually charging and discharging each of said cylinders to fully extend or fully retract said piston rod means, a first one of said piston rod means being coupled to said lever arm means and the other of said piston rod means being coupled to a fixed support adjacent said valve means, whereby said valve control means is capable of rotating said stem means to four positions:
    (a) a first position wherein both piston rod means are both fully extended;
    (b) a second position wherein said first piston rod means is fully extended and said second piston rod means is fully retracted;
    (c) a third position wherein said first piston rod means is fully retracted and said second piston rod means is fully extended; and
    (d) a fourth position when both of said piston rod means are fully retracted.

5. The invention set forth in claim 4 wherein said valve means is a butterfly valve, said cylinders are pneumatic cylinders and are of different lengths and wherein adjustable stop means are provided for said lever arm means when said stem means is in its first and fourth positions.

6. The invention set forth in claim 1 wherein said water supply includes a tank of a washing solution and a tank of a rinse solution, manifold means coupling two tanks to said pump means in advance of said valve means, further valve means on said manifold means for selecting one solution to be delivered to said pump means and means for refilling said tanks.

7. The invention set forth in claim 6 wherein said valve means includes a stem rotatable between a first position in which said valve means is closed to water flow and a second position in which said valve means is open to allow water to flow unrestricted therethrough and wherein said control means is coupled to said stem means for rotating same to at least one position intermediate said first and second positions.

8. The invention set forth in claim 7 wherein said control means, said piston rod means being is coupled to said stem means through lever arm means for rotating said stem means to said intermediate position when said piston rod means is fully extended or fully retracted.

9. The invention set forth in claim 8 wherein said control means comprises two of such cylinders, axially disposed with their piston rod means oppositely directed, means for selectively and individually charging and discharging each of said cylinders to fully extend or fully retract said piston rod means, a first one of said piston rod means being coupled to said lever arm means and the other of said piston rod means being coupled to a fixed support adjacent said valve means, whereby said valve control means is capable of rotating said stem means to four positions:
 (a) a first position wherein both piston rod means are both fully extended;
 (b) a second position wherein said first piston rod means is fully extended and said second piston rod means is fully retracted;
 (c) A third position wherein said first piston rod means is fully retracted and said second piston rod means is fully extended; and
 (d) a fourth position when both of said piston rod means are fully retracted.

10. The invention set forth in claim 9 wherein said valve means is a butterfly valve, said cylinders are pneumatic cylinders and are of different lengths and wherein adjustable stop means are provided for said lever arm means when said stem means is in its first and fourth positions.

11. An apparatus for cleaning containers comprising:
 a carriage mounted cleaner including a frame supported on wheels;
 motor means for driving said wheels and moving said cleaner into and out of a container;
 nozzle means on said cleaner adapted for directing a stream of water toward the interior of said container when said cleaner is therewithin;
 a hose coupled to said nozzles for supplying water thereto;
 a water supply and pump means for delivering water from said supply to said hose;
 spray bars means located on said frame and including generally downwardly directed nozzles;
 diversion valve means for selectively diverting water from said nozzles to said nozzles of said spray bar, said diversion valve comprising a water inlet and first and second water outlets and a piston means within said valve for selectively being urged into sealing engagement with one of said water outlets and cylinder means coupled to said piston for selectively moving said piston toward one of said outlets.

12. The invention set forth in claim 11 wherein said valve comprises a cylindrical housing having a water inlet opening through a side thereof, said water outlets being at opposite ends of said housing, said piston including rod means extending through one of said outlets and sealingly passing through the exterior of said valve means, the other end of said rod being coupled to another piston contained in said cylinder means, movement of said another piston causing longitudinal movement of said first piston in said housing.

13. The invention set forth in claim 12 wherein water entering said housing urges the piston into sealing engagement with said outlet.

* * * * *